US012726527B2

(12) United States Patent
Phan et al.

(10) Patent No.: US 12,726,527 B2
(45) **Date of Patent: *Sep. 1, 2026**

(54) CUSTOMIZABLE CERTIFICATE VALIDATION POLICY

(71) Applicant: ServiceNow, Inc., Santa Clara, CA (US)

(72) Inventors: Thanh Trac Phan, San Diego, CA (US); Bhargav Ramamohan, San Diego, CA (US); Gary Stentiford, Chula Vista, CA (US); Michael Fong, San Diego, CA (US); Matthew M. Marquardt, San Diego, CA (US); Jennifer Luna Sandoval, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 18/605,425

(22) Filed: Mar. 14, 2024

(65) Prior Publication Data

US 2024/0223619 A1 Jul. 4, 2024

Related U.S. Application Data

(63) Continuation of application No. 17/459,896, filed on Aug. 27, 2021, now Pat. No. 11,973,805.

(60) Provisional application No. 63/139,699, filed on Jan. 20, 2021.

(51) Int. Cl.

| | |
|---|---|
| ***H04L 9/40*** | (2022.01) |
| ***H04L 9/08*** | (2006.01) |
| ***H04L 9/32*** | (2006.01) |

(52) U.S. Cl.

CPC .......... *H04L 63/205* (2013.01); *H04L 9/0891* (2013.01); *H04L 9/3265* (2013.01); *H04L 9/3268* (2013.01); *H04L 63/0823* (2013.01); *H04L 63/20* (2013.01)

(58) Field of Classification Search

CPC ... H04L 63/205; H04L 9/0891; H04L 9/3265; H04L 9/3268; H04L 63/0823; H04L 63/20

See application file for complete search history.

(56) References Cited

U.S. PATENT DOCUMENTS

| | | | |
|---|---|---|---|
| 8,683,052 | B1 | 3/2014 | Brinskelle |
| 2013/0152187 | A1 | 6/2013 | Strebe |

(Continued)

*Primary Examiner* — Cheng-Feng Huang

(74) *Attorney, Agent, or Firm* — McDonnell Boehnen Hulbert & Berghoff LLP

(57) ABSTRACT

Specifications of digital certificate validation security policies for a server within an intranet environment are received. A first one of the policies is specified to be applied for an intranet network connection and a second for a network connection outside the intranet. Each of the first and second policies includes a plurality of different configurable individual settings to enable or disable corresponding individual components of a plurality of different component digital certificate validation checks. A digital certificate is received. At least one of the policies to apply is identified. One or more of the plurality of different component checks determined to be performed based on the identified digital certificate validation security policy are performed.

20 Claims, 7 Drawing Sheets

(56) References Cited

U.S. PATENT DOCUMENTS

| | | | | |
|---|---|---|---|---|
| 2016/0026491 | A1* | 1/2016 | Razin | G06F 9/505 718/1 |
| 2016/0316025 | A1* | 10/2016 | Lloyd | H04L 63/0281 |
| 2017/0041344 | A1* | 2/2017 | Nandakumar | H04L 63/102 |
| 2017/0070504 | A1* | 3/2017 | Ramachandran | H04L 63/061 |
| 2017/0289137 | A1* | 10/2017 | Pendarakis | H04L 63/0823 |
| 2017/0310547 | A1 | 10/2017 | Lin | |
| 2018/0316747 | A1* | 11/2018 | Scrivano | H04L 63/083 |
| 2019/0116153 | A1 | 4/2019 | Deverakonda Venkata | |
| 2020/0204618 | A1* | 6/2020 | Agarwal | G06F 16/955 |
| 2021/0344667 | A1* | 11/2021 | Huston, III | H04L 63/126 |

* cited by examiner

CUSTOMIZABLE CERTIFICATE VALIDATION POLICY

CROSS REFERENCE TO OTHER APPLICATIONS

This application is a continuation of U.S. patent application Ser. No. 17/459,896 entitled CUSTOMIZABLE CERTIFICATE VALIDATION POLICY filed Aug. 27, 2021, which is incorporated herein by reference for all purposes, which claims priority to U.S. Provisional Patent Application No. 63/139,699 entitled CUSTOMIZABLE CERTIFICATE VALIDATION POLICY filed Jan. 20, 2021, which is incorporated herein by reference for all purposes.

BACKGROUND OF THE INVENTION

Network topologies often include a server placed within a private network. The internal server can be configured with network access to an outside public network, such as the Internet, as well as with network access to the local network or intranet. The internal server can utilize access to the outside public network to connect to external resources. These external resources can include publicly hosted resources. For example, publicly hosted resources accessible from an internal server can include cloud-based application services, such as configuration management database (CMDB) services and/or third-party software-as-a-service applications. Access to the local network or intranet allows the internal server to access local resources such as locally hosted services that may be private to the local network. Local network access also allows the internal server to be utilized for managing assets that are only accessible from the local network, for example, as part of a CMDB service.

BRIEF DESCRIPTION OF THE DRAWINGS

Various embodiments of the invention are disclosed in the following detailed description and the accompanying drawings.

DETAILED DESCRIPTION

Figure 1:
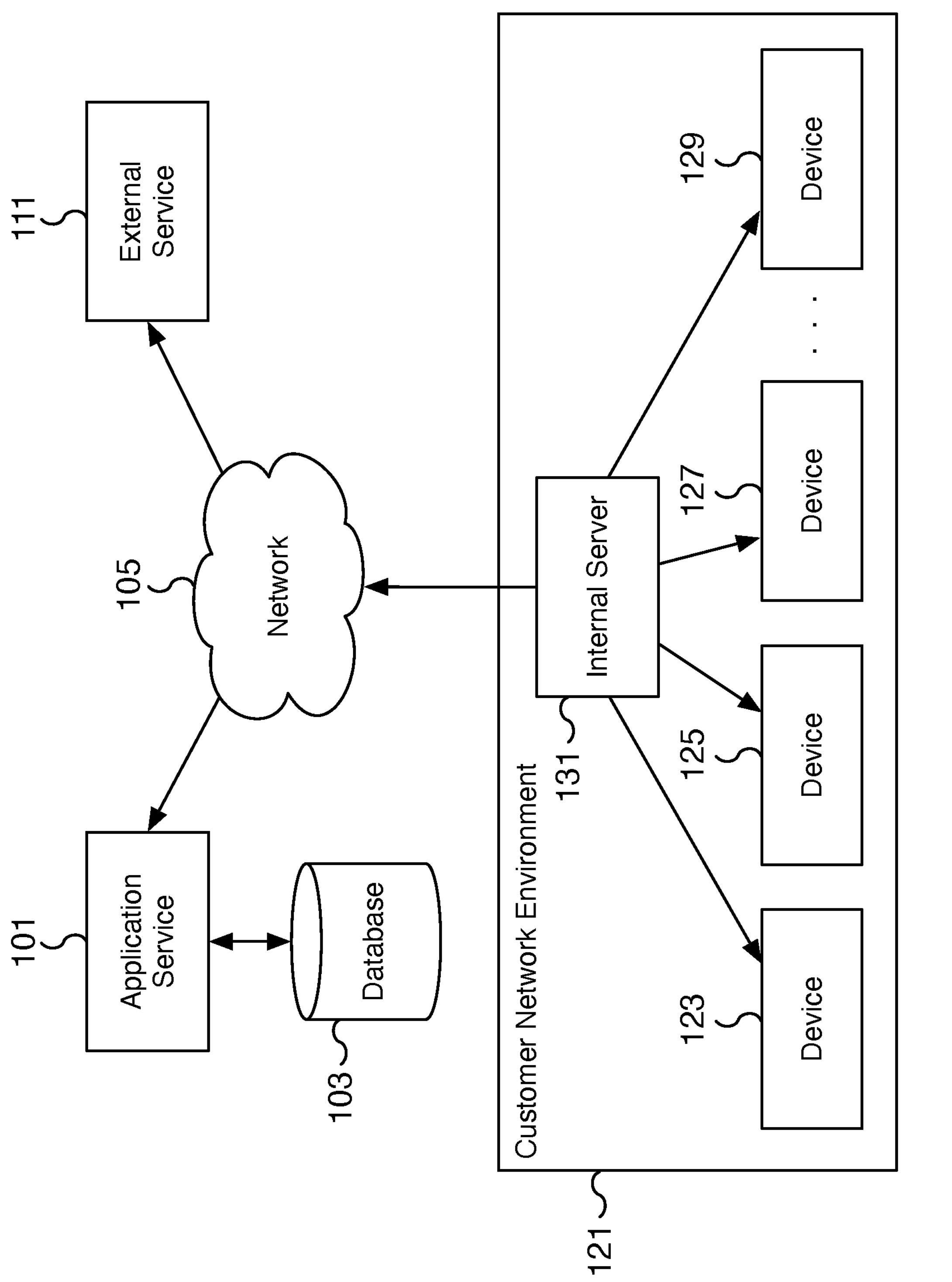
FIG. 1 is a block diagram illustrating an example of a network environment for managing and applying customizable real-time security policies.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A security policy platform for managing and applying customizable real-time security policies for an internal server is disclosed. Using the disclosed techniques, an operator can configure and apply in real-time custom and fine-grained security policies for network connections originating from an internal server. Different security policies can be configured for different network connection types, including different security policies for connections accessing local, external, and other network resources. In some embodiments, the security policies allow an operator to enable one or more endpoint validation checks including hostname validation, validation of the certificate chain, and/or determining whether a certificate is valid and/or has not been revoked. Other security checks can be enabled as well including custom endpoint verification checks and verification checks that rely on third-party verification services. An operator can configure different security policies depending on a connection's endpoint. For example, using the security policy platform, an operator can apply different policies for intranet connections and public Internet connections. Moreover, the operator can also specify custom policies for connections that match a provided description. For example, network connections can be described by domain names, Internet Protocol addresses, and/or a combination of both. In some embodiments, network connections can be described using wildcards and/or masks or another naming scheme to capture a group of connection endpoints. In some embodiments, the network connections also specify a target port and/or protocol. In various embodiments, the internal server is an intranet server that resides in a customer's internal network behind a network firewall and/or other network security devices. On bootup, the internal server can perform a bootstrap process to receive the configured security policies from an external server such as a cloud-based application service used by an operator to manage the custom real-time security policies.

In some embodiments, specifications of digital certificate validation security policies are received for a server within an intranet environment. For example, an internal or intranet server receives security policies from a cloud-based application service for managing custom security policies. The cloud-based application service and the internal server together are part of a security policy platform. In some embodiments, a first one of the digital certificate validation security policies received is specified to be applied for a network connection within the intranet environment and a second one of the digital certificate validation security policies received is specified to be applied for a network connection to a destination outside the intranet. For example, the first digital certificate validation security policy can be applied for connections from the intranet server to connection endpoints within the internal server's intranet environment and the second digital certificate validation security policy can be applied for connections from the intranet server to connection endpoints outside the intranet such as the Internet.

In some embodiments, each of the first and second digital certificate validation security policies includes a plurality of different configurable individual settings to enable or disable corresponding individual components of a plurality of different component digital certificate validation checks. Example configurable individual settings that can be enabled or disabled include hostname validation, validation of a digital certificate chain, and/or determining whether a digital certificate is valid and/or has not been revoked. A given policy can enable or disable any combination of the validation checks. In some embodiments, additional validation checks are also configurable including applying third-party certificate validation services.

In some embodiments, a determination is made to establish a connection with a network destination. For example, a request to establish a network connection from the intranet server to a requested endpoint is made. The connection endpoint can belong to one (or more) of multiple different network groups, such as a connection with an endpoint within the intranet environment, outside the intranet environment, or belonging to a customized network group. In some embodiments, a connection with the network destination is made and a digital certificate from the network destination can be received. In the event a digital certificate is received, one of the digital certificate validation security policies is identified to apply for the connection. For example, a matching security policy for the connection endpoint is identified. In the event multiple security policies meet the matching requirements for an endpoint, for example, the endpoint belongs to multiple network groups, one of the multiple security policies is selected. In various embodiments, the narrowest matching security policy is selected. For example, a network connection endpoint accessible from the Internet can match a security policy for the Internet as well as a security policy specific for the connection's domain name. The security policy specifying the connection domain name is selected because it is the narrower match of the two matching policies.

In some embodiments, for each of the plurality of the different component digital certificate validation checks, a determination is made based on the identified digital certificate validation security policy for the connection whether to perform the component digital certificate validation check for the received digital certificate. Any of the plurality of the different component digital certificate validation checks determined to be performed are performed. For example, based on whether a validation check is enabled by the identified security policy, a security check can be performed or bypassed. In some scenarios, one or more checks may be configured to be skipped, for example, based on the network configuration of the endpoint with relation to the intranet server. This customization allows an operator to configure and apply different security policies for each group of network endpoints instead of applying another approach such as applying the least or most restrictive security policy to all endpoints. Alternative approaches which are broad and less customized can be over or under inclusive and can significantly disrupt network connectivity at the expense of network security. Using the disclosed techniques and security policy platform, an operator can customize the network security policies to best match the appropriate network topology and configured network security of the connection endpoints.

FIG. 1 is a block diagram illustrating an example of a network environment for managing and applying customizable real-time security policies. In the example shown, application service 101, external service 111, and customer network environment 121 are connected to network 105. Network 105 can be a public or private network. In some embodiments, network 105 is a public network such as the Internet. In various embodiments, application service 101 is a cloud-based application service that utilizes database 103, which is communicatively connected to application service 101. Application service 101 together with internal server 131, which is located within customer network environment 121, are part of a security policy platform for managing and applying customizable real-time security policies for internal server 131. Using application service 101, an operator can remotely manage and apply custom security policies for connection endpoints of internal server 131. In the example shown, potential connection endpoints for internal server 131 can include application service 101, external service 111, and devices within customer network environment 121 such as devices 123, 125, 127, and 129.

In some embodiments, application service 101 provides cloud-based services for managing information technology operations including managing and applying customizable real-time security policies such as digital certificate validation security policies for a server within an intranet environment such as internal server 131 within customer network environment 121. Application service 101 can be accessed by network clients (not necessarily shown) that reside within or outside customer network environment 121. Using application service 101, an operator can in real-time configure and enable different connection endpoint validation checks including hostname validation, validation of the certificate chain, and/or determining whether a certificate is valid and/or has not been revoked. Other security checks can be enabled as well including custom endpoint verification checks and verification checks that rely on third-party verification services. The different security policies may be stored on and retrieved from database 103. At various times, including at startup and as policies are modified, the different security policies are synchronized from application service 101 and database 103 to internal server 131.

In some embodiments, database 103 is a configuration management database (CMDB) used at least in part for managing assets that are under the management of an organization, such as the devices of customer network environment 121. Each managed asset can be represented as a configuration item. In some embodiments, database 103 can store information related to managed assets, such as the hardware and/or software configuration of a computing device, as configuration items. Using the disclosed techniques, database 103 can further store information related to security policies such as digital certificate validation security policies for a server including intranet servers. In various embodiments, database 103 provides persistent storage and allows an operator via application service 101 to remotely manage security policies for an intranet server such as internal server 131.

In some embodiments, customer network environment 121 is an information technology network environment and includes multiple hardware devices including devices 123, 125, 127, and 129, as examples. In various embodiments, customer network environment 121 is connected to network 105 and can include one or more network security devices such as a firewall and/or gateway (not shown). The network security devices, such as a firewall device, can limit incoming connections from network 105 into customer network environment 121. In various embodiments, the devices of customer network environment 121, such as devices 123, 125, 127, and 129, run application processes that interact with one another and/or with other computing devices outside of customer network environment 121. In the example shown, internal server 131 is capable of initiating network connection to each of devices 123, 125, 127, and 129 (as shown by the arrows pointing from internal server 131 to the respective devices 123, 125, 127, and 129). Depending on the network configuration, devices 123, 125, 127, and 129 and internal server 131 may not be configured to accept network connections originating from outside customer network environment 121. In some embodiments, the devices of customer network environment 121 such as devices 123, 125, 127, and 129 may be configured with different security configurations. For example, devices 123, 125, 127, and 129 may have a variety of different digital certificate configurations including self-signed certificates, certificates signed by a certificate authority, expired certificates, etc. Each configuration can require a different security policy for establishing an approved network connection.

In the example shown, internal server 131 is an intranet server of customer network environment 121. Internal server 131 can be configured to only initiate and not receive network connections. In various embodiments, internal server 131 is configured on initialization, such as on bootup, startup, or update, to contact application service 101 to receive specifications for configured security policies. Once downloaded onto internal server 131, internal server 131 can apply the configured security policies to outgoing network connections. In various scenarios, internal server 131 is configured to further receive updates to security polices when changes are made, for example, by an operator via application service 101. The different security policies allow internal server 131 to apply a custom security policy depending on a network connection endpoint. As shown in the example of FIG. 1 by the arrows pointing away from internal server 131, internal server 131 can initiate network connections to devices within customer network environment 121 as well as to devices outside customer network environment 121 and communicatively connected to internal service via network 105. For example, internal server 131 can initiate network connections to application service 101 and to external services such as external service 111. Based on the received security policies, internal server 131 can apply different security policies for connections that are internal to customer network environment 121, for connections via network 105, and for connections to specific servers such as the servers associated with external service 111. The different security policies can be applied in real time and can be determined based on the network group (or description) the network endpoint belongs to. In various embodiments, the security policy associated with the narrowest network group is applied. For example, in the event a public network policy exists for devices external to customer network environment 121 and a custom policy exists specific for external service 111, the security policy for external service 111 is applied for connections to external service 111 even though external service 111 also belongs to the network group of the public network policy.

In various embodiments, although certain security policies of internal server 131 can be managed using the disclosed security policy platform via application service 101, internal server 131 can also be used to host or support services such as configuration management database (CMDB) services. For example, internal server 131 may be used to at least in part scan and manage information technology assets within customer network environment 121. Moreover, in some scenarios, internal server 131 can accept incoming connections, for example, from devices within customer network environment 121. For example, in some embodiments, devices 123, 125, 127, and/or 129 can connect to internal server 131 to access internal services hosted by internal server 131.

In the example shown, external service 111 is an external service such as a third-party software-as-a-service application. External service 111 can be a cloud-based service and is accessible from internal server 131 via network 105. In various embodiments, internal server 131 utilizes one or more external services such as external service 111. Additional external services not shown can exist. Depending on the external service, security policies can be configured that are customized to one or more external service connection endpoints. For example, a general public Internet security policy can be configured along with one or more custom security policies for specific external endpoints such as those of external service 111. The endpoints can be configured by domain name, subdomains, Internet Protocol address, and/or by another naming scheme. The custom security policies can enable or disable one or more validation checks based on the endpoint connection.

In various embodiments, the components shown in FIG. 1 may exist in various combinations of hardware machines. Although single instances of components have been shown to simplify the diagram, additional instances of any of the components shown in FIG. 1 may exist. For example, application service 101 may include one or more cloud-based servers. Similarly, database 103 may not be directly connected to application service 101 and/or may be replicated or distributed across multiple components. For customer network environment 121, additional or fewer devices may exist and some components, such as a firewall and/or gateway device, may exist but are not shown. In the example shown, external service 111 is but one example of an external service and additional external services including third-party software-as-an-application services may exist but are not shown. In some embodiments, components not shown in FIG. 1 may also exist.

Figure 2:
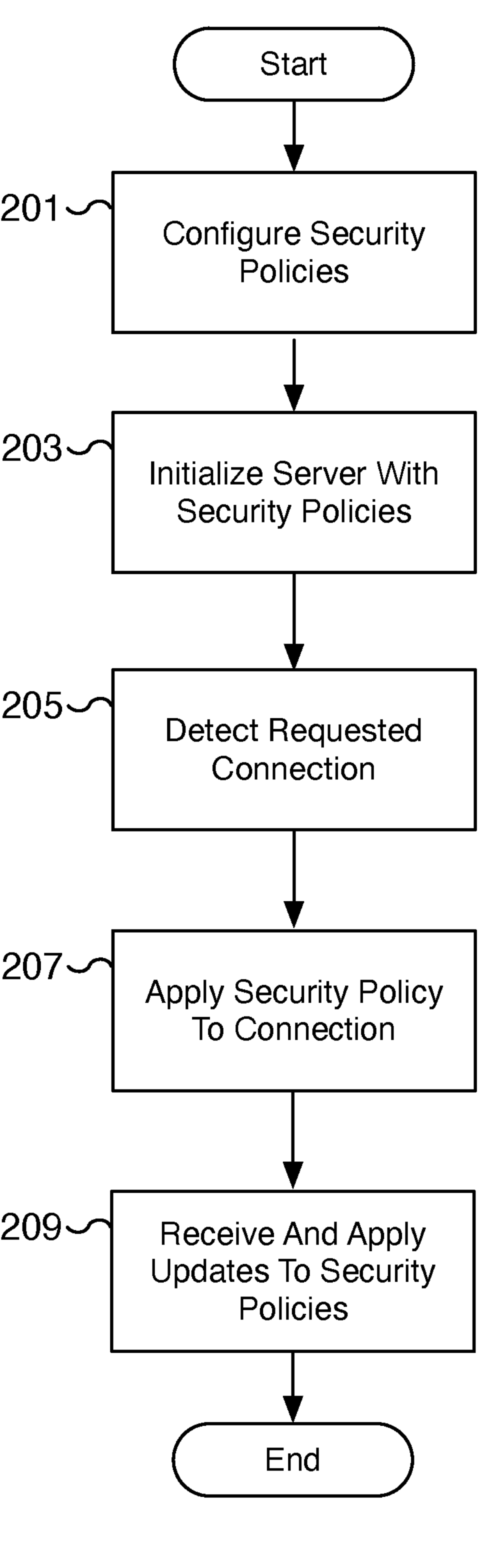
FIG. 2 is a flow chart illustrating an embodiment of a process for managing and applying customizable real-time security policies for an internal server.

FIG. 2 is a flow chart illustrating an embodiment of a process for managing and applying customizable real-time security policies for an internal server. Using the process of FIG. 2, an operator, such as an information technology administrator of an organization, can configure security policies, such as digital certificate validation security policies, for an intranet server such as internal server 131 of FIG. 1 using a cloud-based application service such as application service 101 of FIG. 1. In various embodiments, the cloud-based service is used to remotely manage the security policies that are applied in real-time. The configured security policies can be customized based on network grouping and different policies can be applied depending on the connection endpoint for a connection origination from the internal server. In some embodiments, the organization's information technology environment is customer network environment 121 of FIG. 1 and different policies are configured for endpoints within the organization's information technology environment and for endpoints that exist outside of the organization's information technology environment. In some embodiments, the configuration of the different security policies is stored on and retrieved from a database such as database 103 of FIG. 1.

At 201, security policies are configured. For example, an operator utilized a cloud-based application service to configure security policies such as digital certificate validation security policies for an intranet or internal server. The configured policies can include default policies as well as custom policies that override the default policies. For example, a custom policy can be created for one or more external services that overrides the default public Internet network group policy. In various embodiments, for each policy, the configuration specifies at least a network group that the policy generally applies to as well as one or more validation checks that should be enabled. Example validation checks include hostname validation, validation of the certificate chain, and/or determining whether a certificate is valid and/or has not been revoked. Other security checks can be enabled as well including custom endpoint verification checks and verification checks that rely on third-party verification services as well as checks for other discrepancies in a digital certificate including duplicate digital certificates.

At 203, a server is initialized with the configured security policies. For example, an internal server is initialized with the security policies configured at 201. In some embodiments, the initialization is performed as part of a bootup, startup, or update process. For example, the specific internal server contacts an external application service such as application service 101 of FIG. 1 to receive specifications for configured security policies. In some embodiments, the bootstrap process allows an internal server to be installed in an organization's information technology environment without requiring the organization's firewall to allow incoming connections to the internal server.

At 205, a requested connection is detected. For example, a request to establish a network connection from the internal server is detected. The request may be to an endpoint within the organization's information technology environment or to an endpoint external to the organization's information technology environment such as an endpoint accessible from the public Internet. In various embodiments, the request is detected during the connection setup step with a network endpoint.

At 207, a security policy is applied to the requested connection. Based on the network connection requested, the appropriate security policy is selected and applied to the requested connection. For example, the requested network endpoint is determined to belong to one or more matching network groups. The security policy of the narrowest group is selected and applied to the requested connection. Each validation check of the selected security policy is applied. For example, once a certificate is received from the endpoint destination, validation checks can include validating the hostname of the certificate that matches the hostname of the requested connection, validating the certificate chain, and determining whether the received certificate is valid and/or has not been revoked, among others. In various embodiments, only verified connection endpoints are allowed to establish a network connection. For example, in the event an enabled validation check of the applied security policy fails, the network connection from the internal server to the requested destination is denied.

At 209, updates to the security policies are received and applied. In various embodiments, an operator can update the security policies at any time by applying one or more steps of the configuration process of step 201. For example, an operator can utilize a cloud-based application service to configure or re-configure security policies such as digital certificate validation security policies for the internal server. Existing policies can be changed or deleted, and new policies can be added. Moreover, network groups can be added and/or modified to include or exclude connection endpoints. For example, additional endpoints can be included in an intranet network group or a custom external services network group. In various embodiments, the modified/updated security policies are synchronized from the cloud-based application service to the internal server. In some embodiments, the internal server maintains a connection with the application server and is notified of and receives security policy updates as they are made. In some embodiments, the internal server receives updates on demand or via another appropriate notification mechanism.

Figure 3:
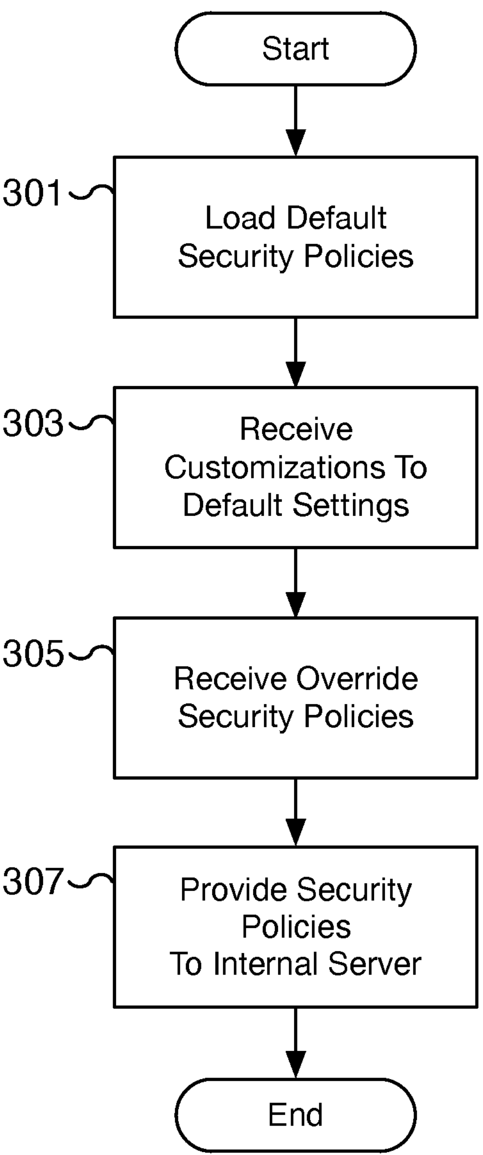
FIG. 3 is a flow chart illustrating an embodiment of a process for configuring customizable real-time security policies for an internal server.

FIG. 3 is a flow chart illustrating an embodiment of a process for configuring customizable real-time security policies for an internal server. Using the process of FIG. 3, an internal server such as an intranet server is configured with security policies, such as digital certificate validation security policies, that are applied in real-time. In some embodiments, the policies are initially configured via a cloud-based application service such as application service 101 of FIG. 1 and are stored in a database such as database 103 of FIG. 1 before they are provided to an internal server such as internal server 131 of FIG. 1. In some embodiments, the process of FIG. 3 is performed at 201 of FIG. 2 by application service 101 of FIG. 1.

At 301, default security policies are loaded. For example, a new internal server is configured with security policies. The initial set of security policies is loaded from a default set of policies. In some embodiments, the default policies include an intranet policy, an Internet policy, and a policy for the application service for remotely managing security policies. In various embodiments, each policy includes a definition for the associated network group that defines what endpoints are included within the group. For example, an intranet policy can include all intranet Internet Protocol addresses. Similarly, an Internet policy can include connection endpoints external to the Intranet. As a third example, the policy for the application service for remotely managing security policies can be specified by domain name. The domain name specification can include wildcards to capture different sub-domains of the application service. In some embodiments, the policies also specify a target port and/or protocol. For example, an endpoint connection can be specified as an Internet Protocol address and port combination.

For each configured default security policy, one or more validation checks are enabled. As an example, for a default intranet policy, a revocation check can be enabled for the digital certificate but a hostname check and certificate chain check can be disabled by default. In contrast, for the default Internet policy, a hostname check and certificate chain check can be enabled but the revocation check can be disabled by default. These default settings are examples and different default settings may be more appropriate based on the network configuration and security profile of the customer network environment. In various embodiments, each security policy has an additional configuration setting to enable or disable the policy and, in some embodiments, each policy is enabled as active by default.

At 303, customizations to the default settings are received. For example, an operator can make modifications to the default security policy settings loaded at 301. For example, an operator may determine that hostname checks should be enabled for the intranet security policy and/or revocation checks should be enabled for the Internet security policy. As another example, an operator may determine that additional endpoints should be included in the definition of the intranet network group. In various embodiments, an operator can make modifications to the security policy configuration settings by using a graphical user interface hosted by the cloud-based application service for managing the security policies. The modifications are received at the application service and may be stored in a corresponding data store such as a cloud-based application database.

At 305, override security policies are received. For example, one or more additional security policies are received that override the default security policies. In various embodiments, the default security policies capture every type of outgoing network endpoint. At 305, additional policies that override the default policies are configured and received. The override security policies allow an operator to configure a custom policy for a network endpoint that also matches one of the default policies. For example, an operator can create a custom policy for a third-party external service that the internal server relies on. The custom policy can enable or disable verification checks that are not otherwise enabled or disabled for the default policy that the external server would otherwise match with (e.g., the Internet security policy). In various embodiments, a specific custom policy is applied over one of the default policies (or another custom policy) because the specific custom policy is the narrowest match for the corresponding connection endpoint.

At 307, security policies are provided to the internal server. For example, the specifications for the configured security policies are provided to the internal server. In some embodiments, the policies are provided at initialization of the internal server, such as at bootup, startup, and/or as part of an update, via a network connection established from the internal server. In various embodiments, anytime the security policies are updated at the external application service, the updated policies are also provided to the internal server so that they can be applied in real time. For example, in some embodiments, the security policies are provided to the internal server via a persistent connection established between the internal server and an external application service.

Figure 4:
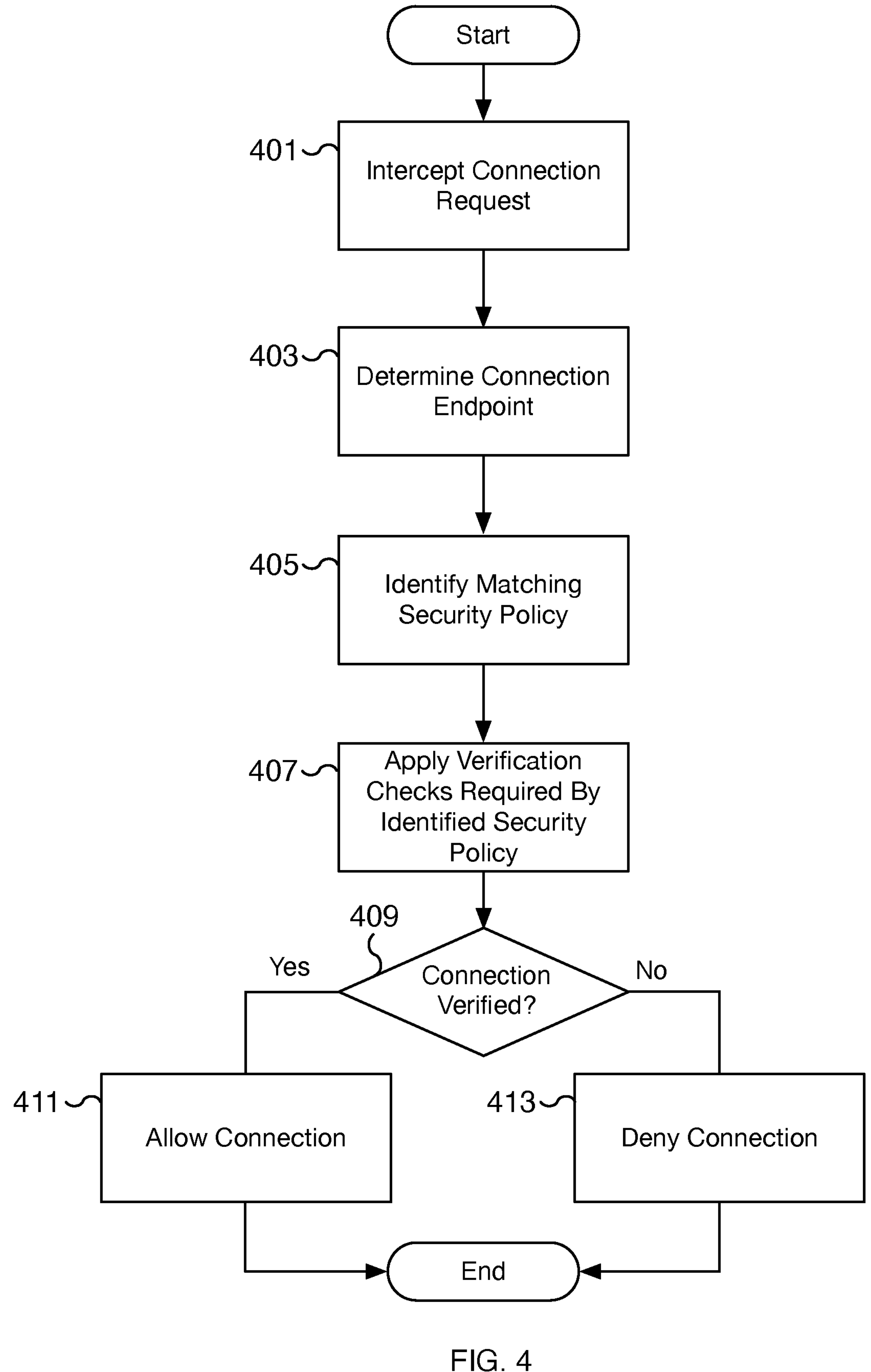
FIG. 4 is a flow chart illustrating an embodiment of a process for applying customizable real-time security policies for an internal server.

FIG. 4 is a flow chart illustrating an embodiment of a process for applying customizable real-time security policies for an internal server. Using the process of FIG. 4, an internal server, such as an intranet server, is configured with security policies, such as digital certificate validation security policies, and applies these security policies in real time. For each requested outgoing network connection, the internal server identifies a corresponding security policy and applies the verification checks of the policy to the requested connection. In various embodiments, the requested network connection is allowed in the event the connection passes the required verification checks and denied in the event the connection does not pass the required verification checks. In some embodiments, the internal server is internal server 131 of FIG. 1 and the applied security policies are configured via and received from a cloud-based application service such as application service 101 of FIG. 1. In some embodiments, the process of FIG. 4 is performed at 205 and/or 207 of FIG. 2 by internal server 131 of FIG. 1.

At 401, a network connection request is intercepted. For example, an application running on the internal server initiates a request for a network connection to a network endpoint. The outgoing network endpoint may be specified by domain name or Internet Protocol address. In various embodiments, the outgoing network endpoint can also specify a target port and/or protocol. When the request is made, the request is intercepted to allow the appropriate security policy to be applied. In some scenarios, the request is to a local address such as to a device within the intranet environment. Alternatively, the request may be to a public domain name, which may be associated with an external application service. In some embodiments, the request is to a public Internet Protocol address accessible from the Internet but an administrator or operator may configure the destination to be treated as if the destination is part of the intranet environment.

At 403, the connection endpoint is determined. For example, one or more resolution techniques are applied to determine the connection endpoint. In some embodiments, both a domain name and an Internet Protocol address are determined for the connection endpoint. For example, in the event the connection is referenced by domain name, a domain name lookup is performed to resolve the domain name to an Internet Protocol address. Similarly, in the event the connection is referenced by Internet Protocol address, a reverse domain name lookup is performed to resolve the Internet Protocol address to a domain name. In some embodiments, other resolution techniques may be utilized as well to determine the connection endpoint. For example, a local service may be utilized to map Internet Protocol addresses to localized domain names.

At 405, a matching security policy is identified. Using the connection endpoints determined at 403, one or more matching security policies are identified. A security policy matches the connection request when the connection endpoint is part of the network group defined by the security policy. In the event multiple policies match the connection endpoint, a narrowest policy is selected. The narrowest policy can be the policy with the narrowest fit to the connection endpoint. For example, a network group that includes five specific endpoints is a narrower match than a network group that includes thousands of endpoints using a subnet mask. As another example, a network group that specifies the full domain name of the requested endpoint is a narrower match than a network group that includes wildcards or masks to define the network group. In some embodiments, matches are determined for both the Internet Protocol address and the domain name of the connection endpoint, and the narrowest security policy is identified. In some embodiments, the port (and/or protocol) utilized for the request is also a factor in determining the appropriate matching policy.

As an alternative, in some embodiments, a security policy is first identified for the specified connection endpoint utilized by the network request. For example, in the event the network request captured at 401 specifies a domain name, only security policies referencing domain names are used to identify a matching security policy. In the event no matching policy is found, only then is an alternative reference for the connection endpoint, in this case the Internet Protocol address, utilized for identifying the appropriate security policy.

In some embodiments, instead of selecting only a single security policy, a ranking of matching policies is identified. For example, a first policy may be the best match and is prioritized over all other matches. A second and third policy may also match the request and may be ranked in reference to the first policy and to each other. In some embodiments, instead of selecting only a single policy, a ranking of policies that match the requested connection is determined from the narrowest to the least narrow matching policy. By determining a ranking of policies, a series of fallback policies can be applied in the event the first security policy does not validate the requested connection. In some embodiments, a security policy can be configured to enable or disable the ability for the policy to act as a fallback policy. Similarly, a security policy can be configured to enable or disable the ability for a policy to trigger fallback policies in the event the policy fails.

At 407, verification checks required by the identified security policy are applied. For example, using the best matching security policy identified at 405, the verification checks of the security policy are applied to the requested connection. In some embodiments, a digital certificate is received from the connection endpoint and each validation check required by the identified security policy is applied. For example, once a certificate is received from the endpoint destination, validation checks can include validating the hostname of the certificate matches the hostname of the requested connection, validating the certificate chain, and determining whether the received certificate is valid and/or has not been revoked, among others. In some embodiments, third party services and/or local services are used to validate the digital certificate as required by the identified security policy. In some embodiments, an Online Certificate Status Protocol (OCSP) request is utilized as one validation check to verify the revocation status of the certificate. In some embodiments, a certificate revocation list (CRL) is utilized as one validation check to verify the revocation status of the certificate.

In some embodiments, multiple security policies can be applied in sequential order in the event a prior matching security policy fails to validate the requested connection. For example, in some embodiments, a ranking of matching policies is identified at 405 and one or more of the security policies can be applied in order of priority. In the event a higher priority policy fails, the next policy by priority is applied until the connection is validated or all matching fallback policies have failed. In some embodiments, security policies are configured with fallback policies to allow the requested connection to be established using one of multiple acceptable different levels of security before the requested connection is denied.

At 409, a determination is made whether the connection is verified. In the event the connection meets verification requirements, processing proceeds to 411. For example, the connection meets verification requirements when a requested connection is validated at 407 using a security policy matching the requested connection identified at 405. In the event the connection does not meet verification requirements, processing proceeds to 413. For example, the connection does not meet verification requirements when no matching security policy identified at 405 when applied at 407 is able to validate the requested connection.

At 411, the connection is allowed. For example, a network connection is established between the internal server and the requested connection endpoint. The connection may be a local connection where both endpoints reside within the intranet environment. Alternatively, the connection may be with another endpoint such as with one associated with a server hosting an external application service. In various embodiments, the connection is only allowed to proceed after the connection request meets the required endpoint verification checks. In some embodiments, the allowed connection is logged. For example, the connection endpoint and corresponding security policy is logged. In the event multiple security policies were applied, for example, the connection is verified with a fallback policy, the connection endpoint and applied security policies, including any failed policies, are logged.

At 413, the connection is denied. For example, the connection requested does not meet the required security verification checks and the connection request is not allowed to proceed. In some embodiments, the denied connection is logged and/or a notification is sent to an administrator.

Figure 5:
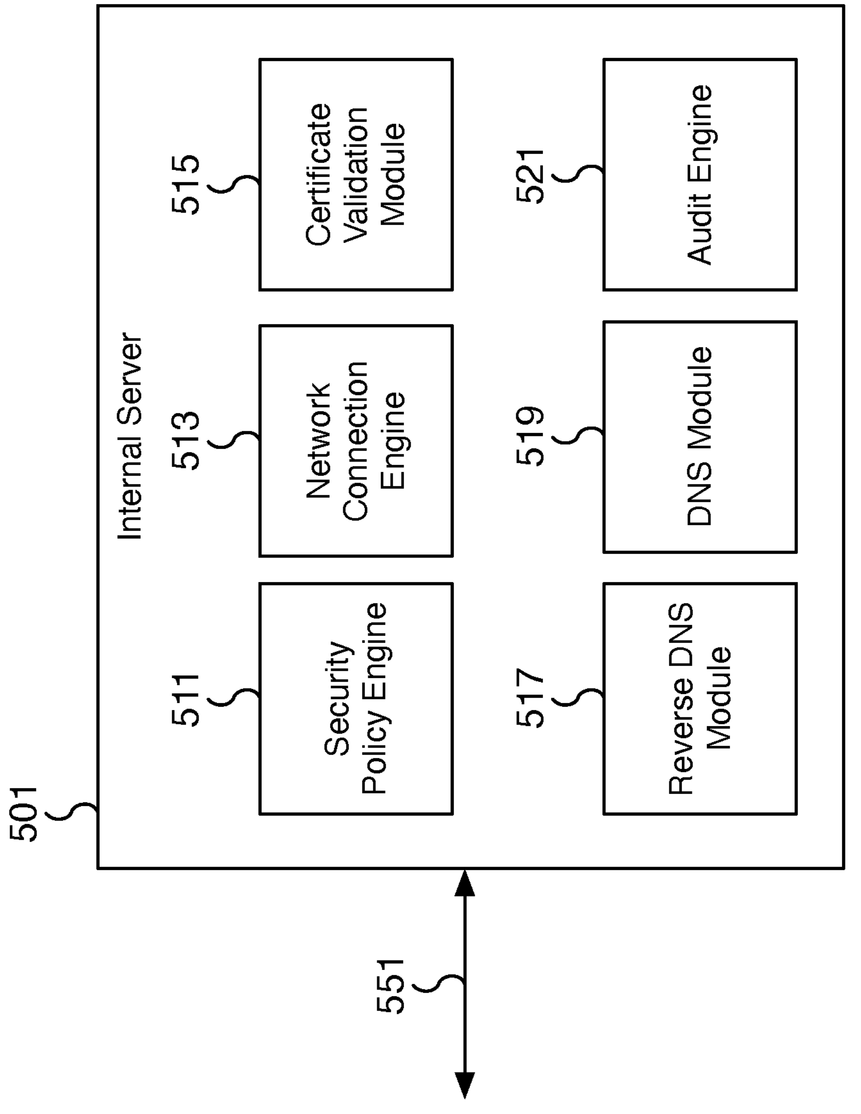
FIG. 5 is a block diagram illustrating an example of an internal server configured for applying customizable real-time security policies.

FIG. 5 is a block diagram illustrating an example of an internal server configured for applying customizable real-time security policies. In the example shown, internal server 501 includes at least components security policy engine 511, network connection engine 513, certificate validation module 515, reverse domain name system (DNS) module 517, domain name system (DNS) module 519, and audit engine 521. Internal server 501 is connected to a network via communications channel 551. In some embodiments, communications channel 551 is implemented using a network connection such as a local network connection. Using the processes of FIGS. 2-4, internal server 501 can apply different security policies, such as digital certificate validation security policies, in real time to requested network connections. In some embodiments, internal server 501 is internal server 131 of FIG. 1 and the applied security policies are configured via application service 101 of FIG. 1. In various embodiments, internal server 501 also hosts additional application services (not shown) such as configuration management database (CMDB) services. In some embodiments, internal server 501 further includes a data store (not shown). Portions of the data store may be local to internal server 501 and/or the data store may be communicatively connected to internal server 501 such as a networked database.

In the example shown, security policy engine 511 is utilized to manage and apply security policies to outgoing network connections. For example, security policy engine 511 can communicate with a cloud-based application service to receive the most up-to-date security policies. Moreover, security policy engine 511 can be used to identify which of the configured policies should be applied to a requested network connection including identifying the best or narrowest matching security policy. In some embodiments, security policy engine 511 utilizes other components of internal server 501 such as network connection engine 513, certificate validation module 515, reverse domain name system (DNS) module 517, domain name system (DNS) module 519, and audit engine 521 for applying the appropriate policy to a requested connection.

In some embodiments, network connection engine 513 is utilized to intercept requested network connections. For example, network connection engine 513 can identify a requested connection with a network endpoint. Once the requested connection is allowed or denied, for example, by security policy engine 511, network connection engine 513 can be used to establish a verified connection or reject a denied connection. In some embodiments, network connection engine 513 is utilized at least in part for initializing and synchronizing the security policy configurations. For example, network connection engine 513 can be utilized to maintain a persistent connection via communications channel 551 with a cloud-based application service such as application service 101 of FIG. 1 for configuring the security policies. In some embodiments, network connection engine 513 is a Transport Layer Security (TLS) and/or a Secure Sockets Layer (SSL) socket factory and is utilized at least in part to perform network connections and network communications via communications channel 551.

In some embodiments, certificate validation module 515 is utilized to apply verification checks of a selected security policy to a requested connection. For example, certificate validation module 515 can be utilized to apply hostname validation, validation of a certificate chain, and/or determining whether a certificate is valid and/or has not been revoked. In some embodiments, additional security checks can be performed by certificate validation module 515 including verification checks that utilize custom endpoint verification systems and/or third-party verification services. In various embodiments, certificate validation module 515 can utilize other modules, such as reverse domain name system (DNS) module 517, domain name system (DNS) module 519, and audit engine 521 as well as external services for performing verification checks.

In some embodiments, internal server 501, including components security policy engine 511 and/or certificate validation module 515, relies on reverse domain name system (DNS) module 517 and domain name system (DNS) module 519 for determining alternative references for a connection endpoint. For example, reverse domain name system (DNS) module 517 can translate an Internet Protocol address to a domain name and domain name system (DNS) module 519 can translate a domain name to an Internet Protocol address. In various embodiments, reverse domain name system (DNS) module 517 and domain name system (DNS) module 519 utilize services including potentially external services for translating endpoints.

In some embodiments, audit engine 521 is utilized by the various components of internal server 501 for auditing the management and application of security policies. For example, audit engine 521 can be used to log failed verification checks for requested network connections that are ultimately denied. As another example, a successfully established connection that relies on a fallback security policy can be logged using audit engine 521 to log the policies that failed as well as the policy that was successful in verifying the connection endpoint. In some embodiments, the data of audit engine 521 is stored locally and/or provided to an external cloud-based application service such as application service 101 of FIG. 1 where the audit data can be viewed by an operator remote to internal server 501.

Figure 6:
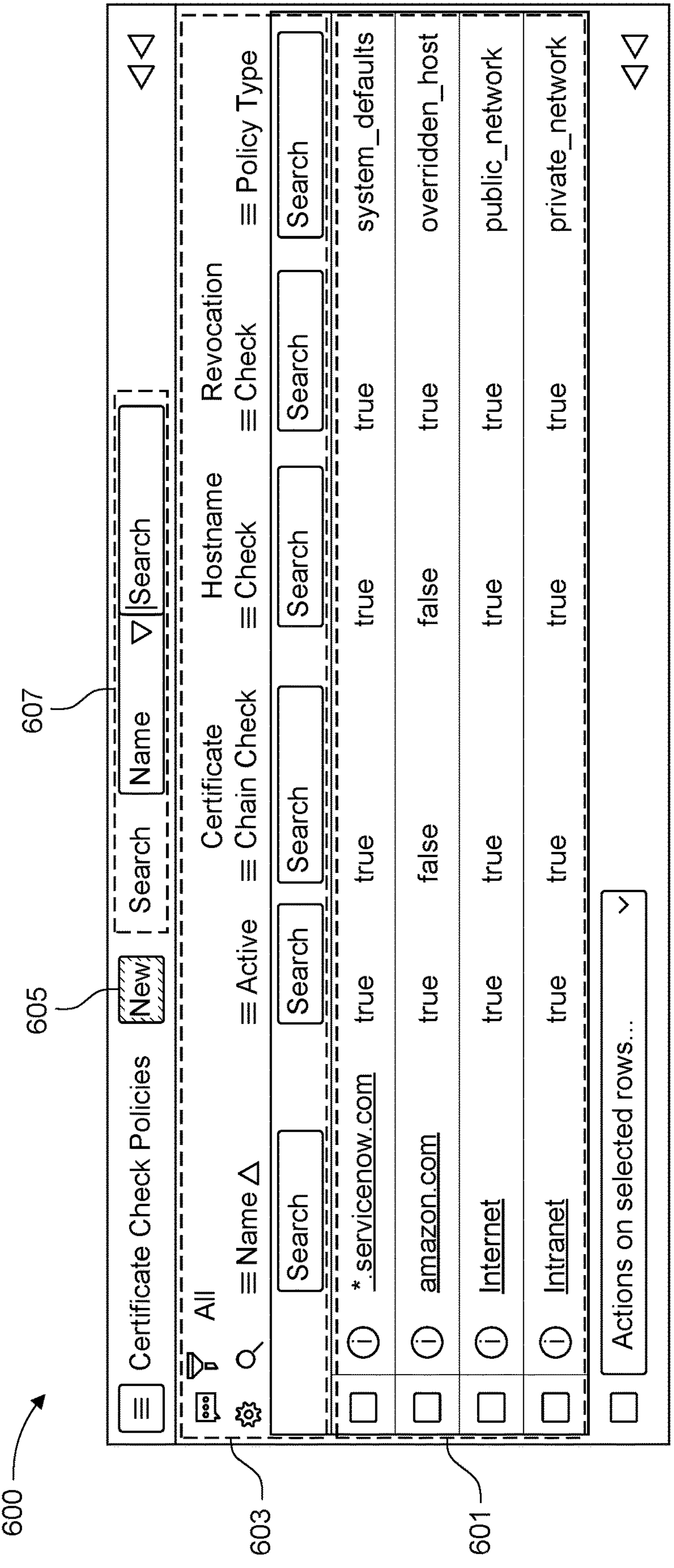
FIG. 6 is a diagram illustrating an embodiment of a user interface for configuring customizable real-time security policies for an internal server.

FIG. 6 is a diagram illustrating an embodiment of a user interface for configuring customizable real-time security policies for an internal server. In the example shown, user interface 600 is part of a graphical user interface for a security policy platform hosted by a cloud-based application service such as application service 101 of FIG. 1. User interface 600 includes at least policies display component 601, configuration functions 603, new policy button 605, and search component 607. Other user interface components and corresponding functionality are provided by user interface 600 but are not labeled. User interface 600 is used to configure security policies to be applied by an internal server such as internal server 131 of FIG. 1 and/or internal server 501 of FIG. 5 using the processes of FIGS. 2-4. In various embodiments, user interface 600 is accessible by an operator from a network device that can exist internal or external to a customer network environment such as customer network environment 121 of FIG. 1. In some embodiments, the specifications of the configured security policies are stored in a cloud-based data store such as database 103 of FIG. 1 and are provided to the internal server when changes are made.

In the example shown, user interface 600 displays certificate check policies that are configured for an internal server. In the specific example, user interface 600 displays four digital certificate validation security policies using policies display component 601. The four policies correspond to a first policy for the *.servicenow.com network group, a second policy for the amazon.com network group, a third policy for an Internet network group, and a fourth policy for an Intranet network group. The first policy for the *.servicenow.com network group corresponds to the cloud-based application service hosting the backend of user interface 600 and provides a security policy for the internal server to establish connections with the application service. The second policy is a custom (or override) policy created to override existing policies. The Internet and Intranet policies correspond to security policies to apply to endpoint connections that reside as part of the Internet network group and Intranet network group, respectively. The specifics of the policies, including the specifications of the corresponding network groups, can be modified using actions enabled by configuration functions 603. For example, the Intranet network group can be modified to include or exclude addition destination endpoints. In various embodiments, an operator can utilize the actions corresponding to configuration functions 603 to modify, search, and manage security policies. New security policies can be created using new policy button 605 and the existing policies can be searched using search component 607. For example, security policies can be searched based on category/property such as based on a policy's name, active setting, certificate chain check setting, hostname check setting, revocation check setting, and policy type.

In various embodiments, a new security policy is created using new policy button 605. This allows the operator to create a new security policy that can potentially override the existing default policies based on the requested connection endpoint. The new policy is created by specifying a name, network group, and the validation checks that should be enabled (or disabled) for the new policy. In some embodiments, a policy type is specified as well. A policy type can correspond to a configured list of validation check settings. Example policy types include system_defaults, public_network, private_network, and overridden_host. For example, in the event an operator creates a second intranet network group, the policy type can also be configured to private_network in order to apply the same validation checks settings as the current and existing Intranet network group shown in policies display component 601. As another example, in the event the operator wants a custom policy to apply to a specific Internet domain, such as amazon.com, the policy type for the custom domain network group can be configured to a different policy type such as overridden_host. In some embodiments, a default policy type exists, such as the system_defaults policy type assigned to the *.servicenow.com network group shown in policies display component 601. In various embodiments, the policy settings of the default policy type can be applied in the event no other policy matches a network endpoint.

In the example shown, three default security policies and a fourth custom (or override) policy are shown in policies display component 601. Each of the displayed policies are configured as active and have certain validation checks enabled or disabled. The default policies correspond to the *.servicenow.com, the Internet, and the Intranet network groups. The default policies shown in FIG. 6 are examples and another configuration and/or setup can have different default security policies. In the example shown, the *.servicenow.com network group, the Internet network group, and the Intranet network group are all active (Active setting is true) and all have certificate chain check, hostname check, and revocation check enabled. In contrast, the custom amazon.com network group is also active (Active setting is true) but only has revocation check enabled while certificate chain check and hostname check are disabled. The custom policy displayed in policies display component 601 is for the domain amazon.com and applies the overridden_host policy. Without the custom policy, a request to an amazon.com URL would apply the Internet policy since the domain amazon.com matches to the Internet network group. However, the amazon.com network group is configured to apply a custom policy (with the overridden_host policy type) in the event a network connection is requested for an amazon.com domain. In the example shown, the custom policy for the amazon.com network group disables the certificate chain check and hostname validation checks but retains the revocation check.

Figure 7:
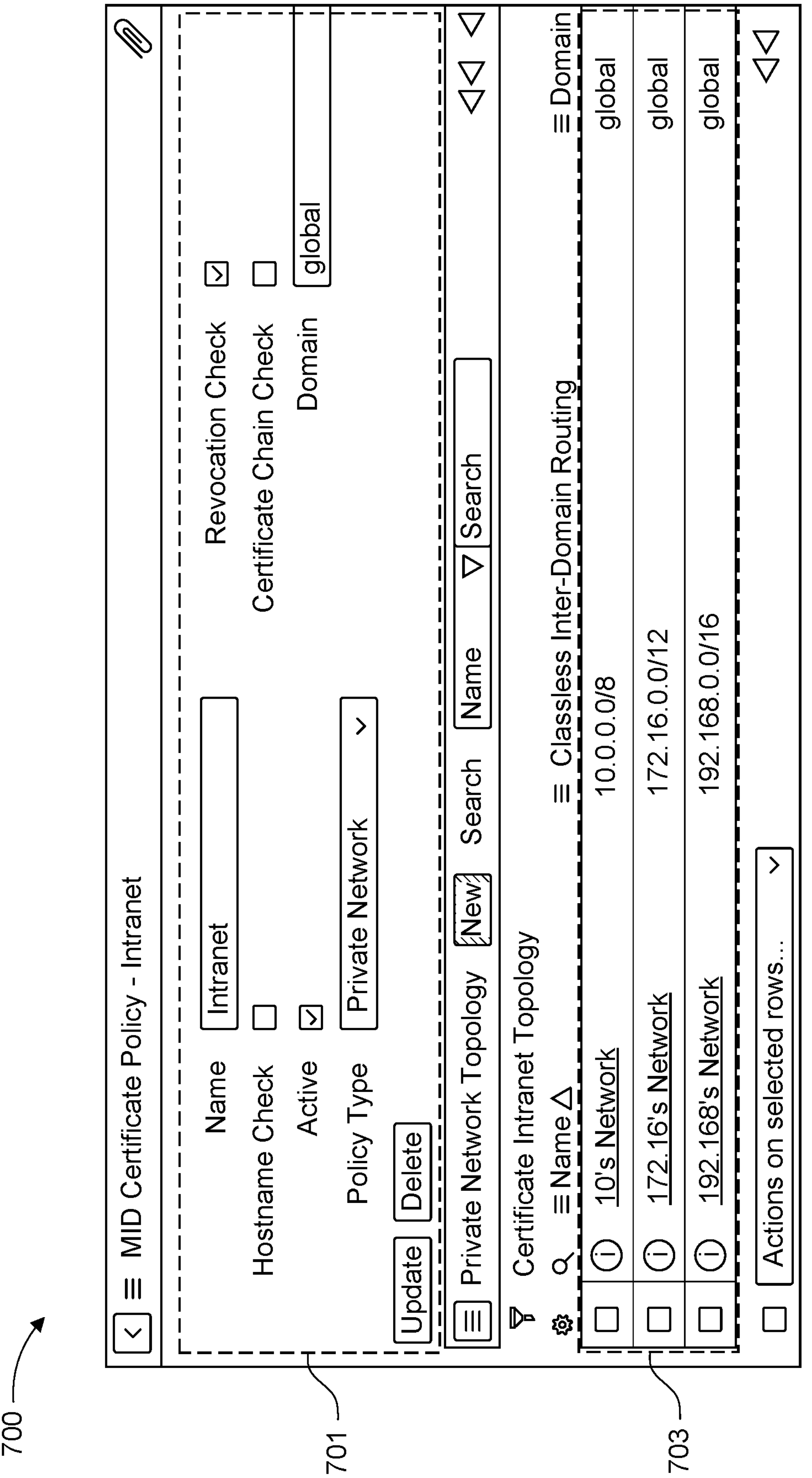
FIG. 7 is a diagram illustrating an embodiment of a user interface for configuring a specific security policy for an internal server.

FIG. 7 is a diagram illustrating an embodiment of a user interface for configuring a specific security policy for an internal server. In the example shown, user interface 700 is part of a graphical user interface for a security policy platform hosted by a cloud-based application service such as application service 101 of FIG. 1 and is accessible from user interface 600 of FIG. 6. For example, user interface 700 is displayed when an operator initiates the configuration of the Intranet policy shown in policies display component 601 of FIG. 6. User interface 700 includes at least policy settings component 701 and topology settings component 703. Other user interface components and corresponding functionality are provided by user interface 700 but are not labeled. User interface 700 is used to configure a specific security policy to be applied by an internal server such as internal server 131 of FIG. 1 and/or internal server 501 of FIG. 5 using the processes of FIGS. 2-4. In various embodiments, user interface 700 is accessible by an operator from a network device that can exist internal or external to a customer network environment such as customer network environment 121 of FIG. 1. In some embodiments, the specifications of the configured security policy are stored in a cloud-based data store such as database 103 of FIG. 1 and are provided to the internal server when changes are made.

In the example shown, user interface 700 displays the configuration for a security policy designed for intranet devices. The upper half of user interface 700 includes policy settings component 701 that allows an operator to configure the name, policy type, domain, and validation checks of the policy. In various embodiments, the settings configured in policy settings component 701 correspond to the settings displayed for the security policy in policies display component 601 of FIG. 6. The bottom half of user interface 700 includes topology settings component 703. Using topology settings component 703, an operator can configure the included endpoints for the network group. As shown in the example, topology settings component 703 includes three intranet network groups: 10's Network, 172.16's Network, and 192.168's Network. Each of the intranet network groups is described by their routing prefix although alternative description formats can be used as appropriate. For example, for an external service, the network group can be described by domain name or using domain masks (such as *.servicenow.com). In various embodiments, an operator can add or remove network groups including individual endpoints to the policy via topology settings component 703.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

receiving, from a remote application service, respective specifications of first and second digital certificate validation security policies, wherein each of the first and second digital certificate validation security policies includes a plurality of individually configurable settings to perform corresponding component digital certificate validation checks;

receiving, from the remote application service, an update to the respective specification of the first digital certificate validation security policy;

applying the update to the first digital certificate validation security policy;

receiving a digital certificate;

selecting, based on the digital certificate, the first digital certificate validation security policy as updated from among the first digital certificate validation security policy as updated or the second digital certificate validation security policy; and performing, using the first digital certificate validation security policy as updated, the corresponding component digital certificate validation checks of the first digital certificate validation security policy as updated.

2. The method of claim 1, wherein versions of the first and second digital certificate validation security policies are stored in a cloud-based datastore and provided to a server within an intranet environment.

3. The method of claim 2, wherein the cloud-based datastore is utilized by the remote application service, and wherein the remote application service provides a graphical user interface for configuring the respective specifications of the first and second digital certificate validation security policies.

4. The method of claim 3, wherein the update to the respective specification of the first digital certificate validation security policy is obtained using the graphical user interface, stored in the cloud-based datastore, and provided by the remote application service to the server.

5. The method of claim 2, wherein at least one of the respective specifications of the first and second digital certificate validation security policies (i) is configured to be applied for a network connection to a destination outside the intranet environment and (ii) specifies a fallback digital certificate validation security policy.

6. The method of claim 2, wherein the respective specifications of the digital certificate validation security policies specify a third digital certificate validation security policy, wherein the third digital certificate validation security policy specifies a fallback digital certificate validation security policy, and wherein the fallback digital certificate validation security policy corresponds to the second digital certificate validation security policy.

7. The method of claim 1, wherein the respective specifications of the digital certificate validation security policies specify a third digital certificate validation security policy to be applied for a network connection to the remote application service.

8. The method of claim 1, wherein the respective specifications of the digital certificate validation security policies specify a third digital certificate validation security policy to be applied for a network connection to an external application service different from the remote application service.

9. The method of claim 1, wherein each of the first and second digital certificate validation security policies specifies a different group of network endpoints.

10. The method of claim 1, wherein the first digital certificate validation security policy is associated with a network connection within a network environment, and wherein the second digital certificate validation security policy is associated with a network connection to a destination outside the network environment.

11. The method of claim 1, wherein selecting the first digital certificate validation security policy as updated from among the first digital certificate validation security policy as updated or the second digital certificate validation security policy comprises:

determining that the first digital certificate validation security policy as updated is narrower than the second digital certificate validation security policy; and based on the first digital certificate validation security policy as updated being narrower than the second digital certificate validation security policy, selecting the first digital certificate validation security policy as updated.

12. The method of claim 1, wherein the plurality of individually configurable settings are configured to enable or disable corresponding components of a plurality of different component digital certificate validation checks, and wherein the corresponding component digital certificate validation checks of each of the first and second digital certificate validation security policies are a subset of the plurality of different component digital certificate validation checks.

13. The method of claim 1, wherein the plurality of individually configurable settings comprises a first setting to perform a hostname validation check and a second setting to perform a certificate chain validation check.

14. A system comprising one or more hardware processors configured to perform operations comprising:

receiving, from a remote application service, respective specifications of first and second digital certificate validation security policies, wherein each of the first and second digital certificate validation security policies includes a plurality of individually configurable settings to perform corresponding component digital certificate validation checks;

receiving, from the remote application service, an update to the respective specification of the first digital certificate validation security policy;

applying the update to the first digital certificate validation security policy;

receiving a digital certificate;

selecting, based on the digital certificate, the first digital certificate validation security policy as updated from among the first digital certificate validation security policy as updated or the second digital certificate validation security policy; and performing, using the first digital certificate validation security policy as updated, the corresponding component digital certificate validation checks of the first digital certificate validation security policy as updated.

15. The system of claim 14, wherein versions of the first and second digital certificate validation security policies are stored in a cloud-based datastore.

16. The system of claim 15, wherein the cloud-based datastore is utilized by the remote application service, and wherein the remote application service provides a graphical user interface for configuring the respective specifications of the first and second digital certificate validation security policies.

17. The system of claim 16, wherein the update to the respective specification of the first digital certificate validation security policy is obtained using the graphical user interface and stored in the cloud-based datastore.

18. The system of claim 14, wherein the respective specifications of the digital certificate validation security policies specify a third digital certificate validation security policy to be applied for a network connection to the remote application service.

19. The system of claim 14, wherein the respective specifications of the digital certificate validation security policies specify a third digital certificate validation security policy to be applied for a network connection to an external application service different from the remote application service.

20. A computer program product, the computer program product being embodied in a non-transitory computer readable storage medium and comprising computer instructions for:

receiving, from a remote application service, respective specifications of first and second digital certificate validation security policies, wherein each of the first and second digital certificate validation security policies includes a plurality of individually configurable settings to perform corresponding component digital certificate validation checks;

receiving, from the remote application service, an update to the respective specification of the first digital certificate validation security policy;

applying the update to the first digital certificate validation security policy;

receiving a digital certificate;

selecting, based on the digital certificate, the first digital certificate validation security policy as updated from among the first digital certificate validation security policy as updated or the second digital certificate validation security policy; and performing, using the first digital certificate validation security policy as updated, the corresponding component digital certificate validation checks of the first digital certificate validation security policy as updated.

* * * * *